United States Patent [19]

McCready et al.

[11] Patent Number: 4,732,947

[45] Date of Patent: Mar. 22, 1988

[54] BLOCK POLYETHERIMIDE ESTER POLYMERS

[75] Inventors: Russell J. McCready; John A. Tyrell, both of Mt. Vernon, Ind.

[73] Assignee: General Electric Company, Pittsfield, Mass.

[21] Appl. No.: 936,693

[22] Filed: Dec. 2, 1986

[51] Int. Cl.⁴ .............................................. C08G 81/00
[52] U.S. Cl. .................................... 525/437; 525/444; 528/289
[58] Field of Search ................. 525/437, 444; 528/289

[56] References Cited

U.S. PATENT DOCUMENTS

| | | | |
|---|---|---|---|
| 4,500,686 | 2/1985 | Kobayashi et al. | 525/408 |
| 4,536,531 | 8/1985 | Ogawa et al. | 524/135 |
| 4,556,688 | 12/1985 | McCready et al. | 525/33 |

Primary Examiner—Lucille M. Phynes

[57] ABSTRACT

Thermoplastic elastomeric polyetherimide ester block copolymers comprising at least one polyetherimide ester recurring structural unit represented by the formula

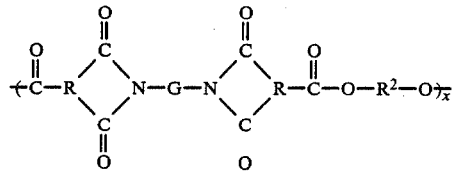

and at least one ester recurring structural unit represented by the formula

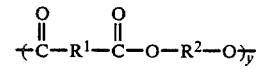

wherein:
G is the divalent radical remaining after the removal of the amino groups of a high molecular weight poly(oxy alkylene)diamine;
$R^1$ is the divalent radical remaining after the removal of the carboxylic groups of a dicarboxylic acid;
$R^2$ is the divalent radical remaining after the removal of the hydroxyl groups of a diol;
y is a number having an average value of from 2 to about 200; and
x is a number having an average value of from 2 to about 40.

28 Claims, No Drawings

BLOCK POLYETHERIMIDE ESTER POLYMERS

BACKGROUND OF THE INVENTION

Thermoplastic polyetherimide ester elastomers comprised of the reaction products of (a) a diol, (b) a dicarboxylic acid, (c) a high molecular weight poly(oxy alkylene)diamine, and (d) a tricarboxylic acid or its derivatives are known and are described in U.S. Pat. Nos. 4,544,734 and 4,556,708 to McCready and in U.S. Pat. No. 4,556,688 to McCready et al. These polyetherimide esters exhibit excellent stress-strain properties low tensile set, high melting temperatures, and/or excellent strength/toughness characteristics as well as superior flexibility which are especially suitable for molding and extrusion applications.

It has now been discovered that block polymers of these polyetherimide esters which contain blocks of ester units and blocks of polyetherimide ester units can be provided.

SUMMARY OF THE INVENTION

The present invention is directed to a thermoplastic elastomeric polyetherimide ester which contains recurring blocks or segments of ester units and recurring blocks or segments of polyetherimide ester units.

DESCRIPTION OF THE INVENTION

In accordance with the instant invention there are provided thermoplastic polyetherimide ester polymers containing recurring segments or blocks of ester units and recurring segments or blocks of polyetherimide ester units. The recurring ester units may be represented by the formula

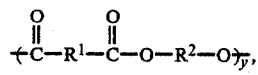 I.

while the recurring segments or blocks of the polyetherimide ester units may be represented by the formula

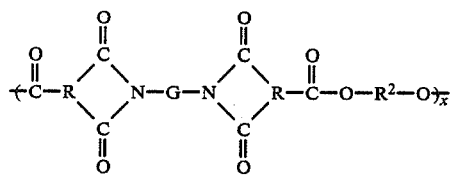 II.

wherein:
G is a divalent radical remaining after the removal of the amino groups of a high molecular weight alkylene ether diamine;
$R^1$ is the divalent radical remaining after the removal of the carboxyl groups of a dicarboxylic acid;
$R^2$ is the divalent radical remaining after the removal of the hydroxyl groups of a diol;
R is a trivalent organic radical;
y is a number having a value of from 2 to about 200; and
x is a number having a value of from 2 to about 40.

In Formulae I and II $R^2$ is the residue, absent the two hydroxyl groups, of a low molecular weight diol, i.e., a diol having a molecular weight of about 300 or less.

In Formula I $R^1$ is the residue, absent the two carboxyl groups, of a dicarboxylic acid, preferably a low molecular weight dicarboxylic acid, i.e., having a molecular weight of less than about 300.

In Formula I G is the residue, absent the two amino groups, of a high molecular weight long chain poly(oxy alkylene)diamine, i.e., having an average molecular weight of from about 600 to 12,000, preferably from about 900 to about 4,000.

The R in Formula I is part of a tricarboxylic acid containing two vicinal carboxylic groups and an additional carboxylic group, or a carboxylic acid anhydride containing an additional carboxylic group. That is to say, R is part of said additional carboxylic group.

In Formula I y is a number having an average value of from 2 to about 200, preferably from 2 to about 150, and more preferably from 2 to about 100. The subscript x in Formula II is a number having an average value from 2 to about 40, preferably from 2 to about 30, and more preferably from 2 to about 20.

Suitable diols for use in preparing the block copolymers of the instant invnetion, and of which $R^2$ is a residue, include the saturated and unsaturated aliphatic and cycloaliphatic dihydroxy compounds. These diols are preferably of a low molecular weight, i.e. having a molecular weight of about 300 or less. When used herein, the term "diols" and"low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3-, and 1,4-dihydroxy cyclohexane; 1,2-, 1,3- and 1,4-cyclohexane dimethanol; butenediol; hexenediol, etc. Especially preferred are 1,4-butanediol and mixtures thereof with hexanediol or butenediol, most preferably 1,4-butanediol.

Aromatic diols suitable for use in the practice of the present invention are generally those having from 6 to about 19 carbon atoms. Included among the aromatic dihydroxy compounds are resorcinol; hydroquinone; 1,5-dihydroxy naphthalene; 4,4'-dihydroxy diphenyl bis(p-hydroxy phenyl)methane and 2,2 bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content be the same diol, most preferably at least 80 mole %. As mentioned above, the preferred compositions are those in which 1,4-butanediol is present in a predominant amount, most preferably when 1,4-butanediol is the only diol Dicarboxylic acids which are suitable for use in the practice of the present invention, and of which $R^1$ is a residue, are aliphatic, cycloaliphatic, and/or aromatic dicarboxylic acids. These acids are preferrably of a low molecular weight, i.e., having a molecular weight of less than about 300; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both carboxyl groups be attached to the same aromatic ring and where more than one ring is present, they can be joined by alipahtic or aromatic divalent radicals such as —O— or —SO$_2$—.

Representative alipahtic and cycloaliphatic acids which can be used for this invention include sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexane-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane carboxylic acid), 3,4-furan dicarboxylic acid, and 1,1-cyclobutane dicarboxylic acid. Preferred aliphatic acids are cyclohexane dicarboxylic acids, glutaric acids, azelaic acid and adipic acid.

Representative aromatic dicarboxylic acids which can be used include terephthalic acid, isophthalic acid, phthalic acid, bi-benzoic acid, substituted dicarboxy compounds with two benzene nuclei such as bis(p-carboxyphenyl)methane, oxybis(benzoic acid), ethylene-1,2-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivative thereof. Hydroxy acids such as p(beta-hydroxyethoxy)benzoic acid can also be used provided an aromatic dicarboxylic acid is also present.

Preferred dicarboxylic acids for the preparation of the block copolymers of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic, and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid be the same dicarboxylic acid or ester derivative thereof. As mentioned above, the preferred block copolymers are those in which dimethylterephthalate is the predominate dicarboxylic acid, most preferably when dimethylterephthalate is the only dicarboxylic acid.

The poly(oxy alkylene)diamines suitable for use in the present invention, and of which G is a residue, may be characterized by the following formula $$H_2N\text{—}G\text{—}NH_2$$

wherein G is the radical remaining after the removal of the amino groups of a long chain alkylene ether diamine. These polyether diprimary diamines are available commercially from from Texaco Chemical Company under the trademark Jeffamine. In general they are prepared by known processes for the amination of glycols. For example, they may be prepared by aminating the glycol in the presence of ammonia, Raney nickel catalyst, and hydrogen as set forth in Belgium Pat. No. 634,741. Alternatively, they may be prepared by treating the glycol with ammonia and hydrogen over a Nickel-Copper-Chromium catalyst as taught by U.S. Pat. No. 3,654,370. Other methods for the production thereof include those taught in U.S. Pat. Nos. 3,155,728 and 3,236,895 and French Pat. Nos. 1,551,605 and 1,466,708. All of the foregoing patents are herein incorporated by reference.

These long chain ether diamines have an average molecular weight of from about 600 to about 12,000, preferably from about 900 to about 4,000. Additionally, the long chain ether diamines generally have a carbon-to-oxygen ratio of from about 1.8 to about 4.3.

Representative long chain poly(oxy alkylene) diamines are the poly(alkylene ether)diamines including poly(ethylene ether)diamine, poly(propylene ether)diamine, poly(tetramethylene ether)diamine; random or block copolymers of ethylene oxide and propylene oxide including poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3). Polyformyl diamines prepared by reacting formaldehyde with diols such as 1,4-butanediol and 1,5-pentanediol and subsequent amination are useful. Especially preferred poly(oxy alkylene)diamines are poly (propylene ether)diamine, poly(tetramethylene ether) diamine and poly(ethylene ether)glycols end-capped with poly(propylene ether)glycol and/or propylene oxide and subsequently aminated.

The tricarboxylic acids suitable for use in the present invention may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any of a number of suitable tricarboxylic acid constituents will occur to those skilled in the art including 2,6,7-naphthalene tricarboxylic anhydride, 3,3',4-diphenyl tricarboxylic anhydride, 3,3',4-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, 1,2,5-naphthalene tricarboxylic anhydride, 1,2,4-butane tricarboxylic anhydride, diphenyl isopropylidene-3,3',4-tricarboxylic anhydride, 3,4-dicarboxyphenyl-3-carboxylphenyl ether anhydride, 1,3,4-cyclohexane tricarboxylic anhydride, etc. These tricarboxylic acid materials can be represented by the following formula

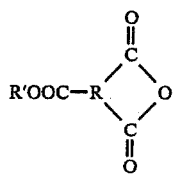

where R is a trivalent organic radical, preferably a $C_2$ to $C_{20}$ aliphatic, aromatic or cycloaliphatic trivalent organic radical and R' is preferably hydrogen or a monovalent organic radical preferably selected from $C_1$ to $C_6$ aliphatic and/or cycloaliphatic radical and $C_6$–$C_{12}$ aromatic radicals, e.g., benzyl, most preferably hydrogen.

The block copolymers of the instant invention may be prepared by preforming the prepolyester or oligomeric units represented by Formula I preforming the prepolyetherimide ester or oligomeric units of Formula II, and then coreacting these oligomers of Formulae I and II to form the block polyetherimide ester copolymer.

Forming the prepolyester units or oligomers of Formula I can be achieved by prepolymerizing or oligomerizing the dicarboxylic acid and the diol by conentional esterification processes. These processes are set forth, for example, in U.S. Pat. Nos. 2,465,319; 3,047,539 and 2,910,466, incorporated herein by reference.

Forming the prepolymer or oligomer of the polyetherimide ester represented by Formula II can be achieved by coreacting the poly(oxy alkylene)diamine, diol, and tricarboxylic acid or its anhydride. Prepolymerization of the diol, poly(oxy alkylene)diamine, and tricarboxylic acid may be carried out using known and conventional imidization and esterification processes. Alternately, it is possible to form the prepolymers or Formula II by first imidizing the the poly(oxy alkylene)diamine by reaction with the tricarboxylic acid to form a polyoxyalkylene diimide diacid using conventional and well known imidization procedures such as those set forth in U.S. Pat. No. 4,552,950, incorporated herein by reference, and then reacting the diimide diacid with the diol under esterification conditions to form the prepolymer of Formula II.

The polyoxyalkylene diimide diacid formed by the imidization reaction between the poly(oxy alkylene) diamine and the tricarboxylic acid or its anhydride may be represented by the formula

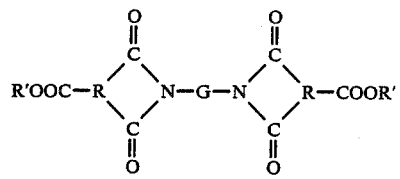

wherein G, R and R' are as defined hereinafore. These diimide diacids are high molecular weight diimide diacids having an average molecular weight greater than about 700, preferably greater than about 900.

Briefly, the polyoxyalkylene diimide diacids of Formula III may be prepared by known imidization reactions including melt synthesis or by synthesizing in a solvent system. For example, the diimide diacid may be prepared by reacting two moles of the tricarboxylic acid component per mole of poly(oxy alkylene) diamine by refluxing at between about 100° C. to 300° C., preferably 150° C. to 250° C. in a suitable solvent such as dimethylformamide, diethylformamide, N-methylcaprolactam, or dimethylsulfoxide, among others known to those skilled in the art, or in an azeotropic mixture of said solvent with an additional inert solvent, e.g., xylene. The solvent is subsequently removed by distillation and the residual solvent may be removed by vacuum drying to leave the diimide diacid. Alternatively the diimide diacid may be prepared by melt synthesis wherein the tricarboxylic component and the diamine are heated at between 100° C. to 300° C., preferably 150° C. to 250° C., while drawing off water, for several hours to yield the diimide diacid.

The oligomers of prepolymers of Formula II may readily be prepared by melt condensation or by synthesizing in a solvent medium. For example, the prepolymers of Formula II may be prepared by reacting the preformed diimide diacid of Formula III with the low molecular weight diol, the latter being present in a molar excess, by refluxing at between abou, 100° C. to about 300° C., preferably 150°0 C. to about 250° C., in a suitable solvent of the type described above for the preparation of the diiimide diacid and in the presence of a catalytic amount of an esterification catalyst such as titanate, e.g., a titanate ester. The melt synthesis used to prepare the prepolymers of Formula II typically involves the reaction in the presence of a titanate catalyst of a polyoxyalkylene diimide diacid with a low molecular weight diol, the latter being present in a molar excess. The reaction takes place at about atmospheric pressure while the temperature is increased up to about 240°-300° C. while distilling off volatiles. The resulting prepolymer is of a low molecular weight. If the molecular weight of this prepolymer is to be increased, i.e., the value of x in formula II increased, the reaction is continued at 240°-300° C. at reduced pressures.

The typical procedure for the preparation of the prepolymer or oligomer of Formula II can be varied widely. For example, an alternative to the foregoing procedure of reacting the preformed diimide diacid with the diol is, as mentioned above, to directly charge the reactor system with the poly(oxy alkylene) diamine, the tricarboxylic acid component, and the low molecular weight diol.

Specifically, when preparing the prepolymers of Formula II by the procedure in which the diimide diacid is formed during the course of the melt condensation, the tricarboxylic acid component and the poly(oxy alkylene)diamine are charged in place of the preformed diimide diacid along with the diol. From then on, the melt condensation is conducted substantially in the same manner as previously described. In theory, two moles of tricarboxylic acid component react with one mole of diamine; however, when the diimide diacid is prepared in the presence of the low molecular weight diol, a minor amount of tricarboxylic acid component may react with available hydroxyl groups and ultimately function as a branching agent in the prepolymer of Formula II. Within limits, the degree of branching can be controlled by varying the mole ratio of tricarboxylic component to diamine. An excess of diamine reduces the degree of branching while an excess of tricarboxylic component increases branching. Ratios of 2 moles of tricarboxylic component to 0.85 to 1.15 moles of diamine yield useful prepolymers of Formula II. In addition to controlling branching by varying the tricarboxylic component/diamine mole ratio, one can compensate for branching by introducing a monofunctional reactant such as benzoic acid in minor amounts.

With reference to branching, it should be noted that the prepolymers of this invention, when prepared from from preformed diimide diacids are substantially free of branching. If branching is desired, one needs only to introduce a branching agent. such as trimellitic anhydride, along with the preformed diimide diacd. The amount of branching agent will generally be less than about 0.15 moles per mole of diimide diacid. Useful branching agents other than trimellitic anhydride include trimethyl trimellitate, glycerol, trimethylol propane, trimesic acid and its esters, and the like.

The amount by which each of the reactants, i.e., diol, dicarboxylic acid, poly(oxy alkylene)diamine and tricarboxylic acid or polyoxyalkylene diimide diacid is employed in the preparation of the block copolymers of the present invention is not, in general, critical and depends, in part, upon the desired properties of the resultant block copolymers. Obviosuly, sufficient amounts of diol and dicarboxylic acid must be present to form the prepolymers of Formula I. Likewise sufficient amounts of diol and diimide diacid or diamine and tricarboxylic acid must be present to form the prepolymers of Formula II.

The amounts of the prepolymers of Formulae I and II present in the block copolymers of the present invention are generally not critical and depend, to a certain degree, upon the desired physical and chemical properties of the block copolymer. In general, the lower the weight ratio of the prepolymers of Formula II to the prepolymers of Formula I the better the strength, crystallization and heat distortion properties of the polymer. Alternately, the higher the ratio the better the flexibility, tensile set, and low temperature impact characteristics. Generally, block copolymers containing a weight ratio of prepolymer II to prepolymer I from about 0.25 to about 2.0 are preferred, while those containing a weight ratio of from about 0.4 to about 1.4 are more preferred.

As mentioned previously the block copolymers of the present invention may be conveniently prepared by coreacting the preformed prepolymers or oligomers of Formulae I and II. The reaction conditions are such as to allow the coreaction of these two prepolymers to form the block copolymers of the instant invention. These block copolymers may be prepared by conventional esterification/condensation reactions for the production of polyesters. Exemplary of the processes that may be practiced are those described in U.S. Pat. Nos. 3,023,192, 3,763,109, 3,651,014, 3,633,653 and 3,801,537, all of which are incorporated herein by reference.

It is customary and preferred to utilize a catalyst in the process for the production of the polyetherimide ester block copolymers of the present invention. In general, any of the known ester-interchange and polycondensation catalysts may be used. Examplary of the suitable known catalysts there may be given the acetates, carboxylates, hydroxides, oxides, alcoholates or organic complex compounds of zinc, manganese, antimony, cobalt, lead, calcium, and the alkali metals insofar as these compounds are soluble in the reaction mixture. Specific examples include zinc acetate, calcium acetate and combinations thereof with antimony trioxide and the like. These catalysts as well as additional useful catalysts are described in U.S. Pat. Nos. 2,465,319, 2,534,028, 2,850,483, 2,892,815, 2,937,160, 2,998,412, 3,047,539, 3,110,693 and 3,385,830, among others, incorporated herein by reference.

Where the reactants and reaction conditions allow it is preferred to use the titanium catalysts including the inorganic and organic titanium containing catalysts, such as those described, for example, in U.S. Pat. Nos. 2,720,502, 2,727,881, 2,729,619, 2,822,348, 2,906,737, 3,047,515, 3,056,817, 3,056,818 and 3,075,952, incorporated herein by reference. Especially preferred are the organic titinates such as tetrabutyl titanate, tetra-isopropyl titanate and tetraoctyl titanate and the complex titanates derived from alkali or alkaline earth metal alkoxides and titanate esters, most preferably the organic titanates. The catalyst is present in catalytic amounts. These catalytic amounts are generally from about 0.005 to about 2 percent by weight based on total reactants.

Both batch and continuous methods can be used for any stage of the etherimide ester block copolymer preparation. Polycondensation of the polyester prepolymer with the etherimide ester prepolymer can also be accomplished in the solid phase by heating finely divided solid polyester prepolymer with the etherimide ester prepolymer in a vacuum or in a stream of inert gas to remove liberated low molecular weight diol. This method has the advantage of reducing degradation because it must be used at temperatures below the softening point of the polyester prepolymer. The major disadvantage is the long time required to reach a given degree of polymerization.

Although the copolyetherimide ester block copolymers of this invention posses good resistance toward heat aging and photodegradation, it is advisable to stabilize these compounds by incorporating therein antioxidants.

Many of the oxidative and/or thermal stabilizers known in the art for copolyesters may be used in the practice of the present invention. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some illustrative non-limiting examples of these stabilizers are set forth in U.S. Pat. No. 4,566,688, incorporated herein by reference.

Stabilization against ultraviolet radiation can be obtained by use of known ultraviolet radiation stabilizers such as the benzophenones, benzotriazoles, cyanoacrylates, and the like.

Further, the properties of these block copolymers can be modified by the incorporation of various conventional inorganic fillers such as carbon black, silica gel, alumina, clay and glass such as glass particles or chopped fiberglass. These may optionally be incorporated in amounts up to about 50% by weight, preferably up to about 30% by weight. The instant polymers may also optionally have admixed therewith the commonly known and used flame retardant agents such as those containing a sulfur and/or a halogen atom(s).

In a preferred embodiment the block copolymers of the instant invention are free of dimer acids, particularly high molecular weight dimer acids, either as one of the reactants or as an additional component of the polymers.

DESCRIPTION OF THE PREFERRED EMBODIMENT

The following examples are set forth to further illustrate the present invention. They are not to be construed as limiting the invention thereto. Unless otherwise specified all parts and percentages are on a weight basis.

The following examples illustrate the block copolymers of the instant invention.

EXAMPLE 1

This example illustrates the preparation of a polyetherimide ester prepolymer for use in the preparation of the block copolymers of this invention.

Into a reactor vessel are placed 100 parts by weight of butanediol, 500 parts by weight of a polyoxyalkylene diimide diacid (prepared by the imidization of trimellitic anhydride with JEFFAMINE D2000, a propylene ether diamine having an average molecular weight of about 2,000), a phenolic antioxidant, and a titanium cayalst. The mixture is heated to about 180° C. wherupon water is generated. After the theoretical amount of water is removed the pot temperature is increased to about 250° C. and a vacuum applied for about 2 hours to form the polyetherimide ester. The Brookfield viscosity measured at 100°C. was 3,800 centipoise.

EXAMPLE 2

This example illustrates a polyetherimide ester block copolymer derived from a polybutylene terephthalate prepolymer and the polyetherimide ester prepolymer prepared in accordance with the procedure of Example 1.

Into a reactor vessel are placed 160 parts by weight of butanediol, 200 parts by weight of dimethyl terephthalate and a titanium catalyst. The mixture is heated to about 165°–180° C. whereupon methanol is generated. After the theoretical amount of methanol is removed the pot temperature is increased to about 205° C. A sample of the prepolymer is removed and is found to have a Brookfield viscosity of 100 centipoise measured at 200° C. At this point 260 parts by weight of the polyetherimide ester prepolymer of Example 1 are added slowly to the reaction mixture. The temperature is then increased to about 250° C. and a vacuum is applied. The resultant polymer is subjected to the following tests in order to determine its physical properties: ASTM D790 to determine the Flexural Modulus; ASTM D638 to determine the Tensile Elongation; ASTM D256 to determine the Notched Izod; and its melting point is also determined.

This polymer is found to have a Flexural Modulus of 12,160 pounds per square inch; a Tensile Elongation of 514%; there is no break in the Notched Izod test; and its melting point is 206° C.

The block copolymers of the present invention contain alternating blocks or segments of the prepolymers of Formula I and the prepolymers of Formula II. That is to say, the block copolymers of the instant invention may be schematically represented by the structure

—I—II—I—II—I—II—I— wherein I and II are as defined hereinafore. It is to be understood that units I and II in this schematic representation need not be of the same lenght or molecular weight. That is to say, the units of Formula I contained in the block copolymer may have different lengths or molecular weights, i.e., y may vary from unit to unit. Likewise, the units of Formula II present in the block copolymer may also having varying lengths or molecular weights, i.e., x may vary from unit to unit.

The block copolymers of the instant invention are useful in the preparation of extruded or molded articles.

Obviously other modifications and variations of the aforedescribed embodiments of the instant invention are possible in light of the above detailed description. It is, therefore to be understood that all such variations and modifications are within the full intended cope of the instant invention as defined by the appended claims.

What is claimed is:

1. A thermoplastic elastomeric polyetherimide ester block copolymer comprising at least one polyetherimide ester recurring structural unit represented by the formula

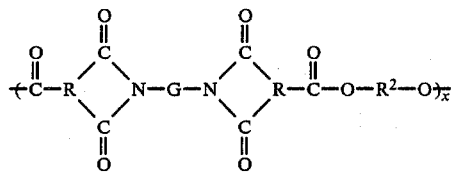

and at least one ester recurring structural unit represented by the formula

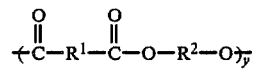

wherein:
  G is a divalent radical remaining after the removal of the amino groups of a high molecular weight alkylene ether diamine;
  $R^1$ is the divalent radical remaining after the removal of the carboxylic groups of a dicarboxylic acid;
  $R^2$ is the divalent radical remaining after the removal of the hydroxyl groups of a diol;
  R is a trivalent organic radical;
  y is a number having an average value of from 2 to about 200; and
  x is a number having an average value of from 2 to about 40.

2. The copolymer of claim 1 wherein said alkylene ether diamine has an average molecular weight of from about 600 to about 12,000.

3. The copolymer of claim 2 wherein said alkylene ether diamine has an average molecular weight of from about 900 to about 4,000.

4. The copolymer of claim 2 wherein said alkylene ether diamine is selected from poly(ethylene ether)diamine, poly(propylene ether)diamine, poly (tetramethylene ether)diamine, or mixtures thereof 5. The copolymer of claim 1 wherein said diol is a low molecular weight diol having a molecular weight of about 300 or less.

6. The copolymer of claim 5 wherein said diol is a $C_2$ to $C_{19}$ aliphatic or cycloaliphatic diol, or mixtures thereof.

7. The copolymer of claim 6 wherein said diol is 1,4-butanediol.

8. The copolymer of claim 6 wherein said diol is a mixture of 1,4-butanediol and a diol selected from butenediol, cyclohexane dimethanol, or hexanediol.

9. The copolymer of claim 1 wherein said dicarboxylic acid is selected from aliphatic, cycloaliphatic or aromatic dicarboxylic acids or their ester forming reactive derivatives.

10. The copolymer of claim 9 wherein said dicarboxylic acid is selected from aromatic dicarboxylic acids or their ester forming reactive derivatives.

11. The copolymer of claim 10 wherein said dicarboxylic acid is dimethylterephthalate.

12. The copolymer of claim 1 wherein R is independently selected from $C_2$ to $C_{20}$ aliphatic, cycloaliphatic, or aromatic trivalent radicals.

13. The copolymer of claim 12 wherein R is independently selected from aromatic radicals 14. A thermoplastic elastomeric polyetherimide ester block copolymer comprised of the reaction products of at least one polyetherimide ester prepolymer represented by the formula

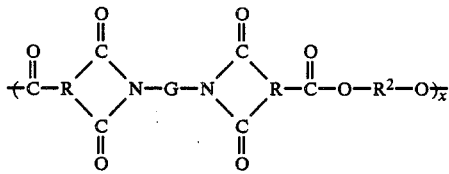

and at least one ester prepolymer represented by the formula

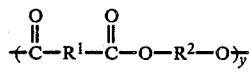

wherein:

G is a divalent radical remaining after the removal of the amino groups of a high molecular weight poly(oxy alkylene)diamine $R^1$ is the divalent radical remaining after the removal of the carboxylic groups of a dicarboxylic acid;

$R^2$ is the divalent radical remaining after the removal of the hydroxyl groups of a diol;

R is a trivalent organic radical;

x is a number having an average value of from 2 to about 40; and y is a number having an average value of from 2 to about 200.

15. The copolymer of claim 14 wherein x has an average value of from 2 to about 30 and y has an average value of from 2 to about 150.

16. The copolymer of claim 15 wherein x has an average value of from 2 to about 20 and y has an average value of from 2 to about 100.

17. The copolymer of claim 14 wherein said poly(oxy alkylene)diamine has an average molecular weight of from about 600 to about 12,000.

18. The copolymer of claim 15 wherein said poly(oxy alkylene)diamine has an average molecular weight of from about 900 to about 4,000.

19. The copolymer of claim 17 wherein said poly(oxy alkylene)diamine is selected from poly (ethylene ether)diamine, poly(propylene ether)diamine, poly(tetramethylene ether)diamine or mixtures thereof.

20. The copolymer of claim 14 wherein said diol is a low molecular weight diol having a molecular weight of about 300 or less.

21. The copolymer of claim 20 wherein said diol is a $C_2$ to $C_{19}$ aliphatic or cycloaliphatic diol, or mixtures thereof.

22. The copolymer of claim 21 wherein said diol is 1,4-butanediol.

23. The copolymer of claim 21 wherein said diol is a mixture of 1,4-butanediol and at least one diol selected from butenediol, hexanediol, or cyclohexane dimethanol.

24. The copolymer of claim 14 wherein said dicarboxylic acid is selected from aliphatic, cycloaliphatic or aromatic dicarboxylic acids or their ester forming reactive derivatives.

25. The copolymer of claim 24 wherein said dicarboxylic acid is selected from aromatic dicarboxylic acids or their ester forming reactive derivatives.

26. The copolymer of claim 25 wherein said aromatic carboxylic acid is dimethyl terephthalate.

27. The copolymer of claim 14 wherein R is independently selected from $C_2$ to $C_{20}$ aliphatic, cycloaliphatic or aromatic trivalent radicals.

28. The copolymer of claim 17 wherein R is independently selected from aromatic trivalent radicals.

* * * * *